United States Patent
Deshpande

(10) Patent No.: US 7,631,095 B2
(45) Date of Patent: Dec. 8, 2009

(54) SYSTEMS AND METHODS FOR OBTAINING THE METADATA FOR AN INTERNET RADIO STATION IN A BANDWIDTH-EFFICIENT MANNER

(75) Inventor: Sachin G. Deshpande, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1041 days.

(21) Appl. No.: 11/059,203

(22) Filed: Feb. 16, 2005

(65) Prior Publication Data

US 2006/0182087 A1    Aug. 17, 2006

(51) Int. Cl.
   *G06F 15/16* (2006.01)
(52) U.S. Cl. .................. 709/231; 370/477; 704/500
(58) Field of Classification Search ........... 709/231; 704/278, 500; 370/270, 465, 477; 725/39; 455/12.1; 707/1
   See application file for complete search history.

(56) References Cited

U.S. PATENT DOCUMENTS

| | | | |
|---|---|---|---|
| 6,505,160 B1 | 1/2003 | Levy et al. | |
| 7,113,998 B1* | 9/2006 | Stern et al. ................ | 709/231 |
| 7,277,877 B2* | 10/2007 | Hughes ..................... | 707/1 |
| 7,398,051 B1* | 7/2008 | Bates et al. ............... | 455/12.1 |
| 2001/0050920 A1* | 12/2001 | Hassell et al. ............ | 370/465 |
| 2002/0099737 A1 | 7/2002 | Porter et al. | |
| 2002/0103920 A1 | 8/2002 | Berkun et al. | |
| 2003/0033606 A1 | 2/2003 | Puente et al. | |
| 2003/0236905 A1* | 12/2003 | Choi et al. ................ | 709/231 |
| 2004/0186733 A1* | 9/2004 | Loomis et al. ............ | 704/278 |
| 2005/0022237 A1* | 1/2005 | Nomura .................... | 725/39 |

| 2006/0153103 A1* | 7/2006 | Sato ......................... | 370/270 |
|---|---|---|---|

FOREIGN PATENT DOCUMENTS

| EP | 1 130 525 | 9/2001 |
|---|---|---|
| JP | 11-265396 | 9/1999 |
| JP | 11-272287 | 10/1999 |
| WO | WO-00/79365 | 12/2000 |

(Continued)

OTHER PUBLICATIONS

Krishnan, "Customized Internet Radio", Computer Networks, Jun. 2000, pp. 609-618, 33, Elsevier Science Publishers B.V.

(Continued)

*Primary Examiner*—Jungwon Chang
(74) *Attorney, Agent, or Firm*—Austin Rapp & Hardman

(57) ABSTRACT

A client connects to an Internet radio server to receive a data stream corresponding to an Internet radio station. Metadata is received on the Internet radio station data stream. In some cases some media data is also received on the Internet radio station data stream. Once the metadata is received, the client disconnects from the Internet radio server. The client determines when next metadata is going to be sent on the Internet radio station data stream, and reconnects to the Internet radio server before the next metadata is sent on the Internet radio station data stream. The steps of receiving the metadata, disconnecting from the Internet radio server, determining when the next metadata is going to be sent, and reconnecting to the Internet radio server may be performed repeatedly.

20 Claims, 7 Drawing Sheets

FOREIGN PATENT DOCUMENTS

| | | |
|---|---|---|
| WO | WO-03/067467 | 8/2003 |
| WO | 2004098187 | 11/2004 |

OTHER PUBLICATIONS

Radio@AOL website, http://www.aol.com (visited May 23, 2005).

Netscape Radio website, http://channels.netscape.com/ns/music/radio/default.jsp (visited May 23, 2005).

RealNetworks RealOne Player website, http://www.real.com (visited May 23, 2005).

Windows Media website, http://www.windowsmedia.com (visited May 23, 2005).

\* cited by examiner

SYSTEMS AND METHODS FOR OBTAINING THE METADATA FOR AN INTERNET RADIO STATION IN A BANDWIDTH-EFFICIENT MANNER

TECHNICAL FIELD

The present invention relates generally to computers and computer-related technology. More specifically, the present invention relates to systems and methods for obtaining the metadata for an Internet radio station in a bandwidth-efficient manner.

BACKGROUND

Internet radio is the transmission of audio programs to one or more recipients via the Internet. There are many different types of Internet radio stations in operation today. Some Internet radio stations are simply simulcasts of traditional radio stations. However, other Internet radio stations are completely independent from traditional radio stations and broadcast only on the Internet. Because of the increase in Internet connection speeds and the decrease in connection costs, the popularity of Internet radio is likely to continue to increase.

There are many components that are involved in the creation of an Internet radio station. Initially, a program signal for the Internet radio station is generated. The program signal includes the content of the Internet radio station. Once the program signal has been generated, encoding tools are used to encode the program signal into a data stream. A server exposes the data stream to clients, which may connect to the server and receive the data stream.

The data stream for an Internet radio station may include both media payload data and metadata. The media payload data is the data that comprises the content of the Internet radio station. For example, if the Internet radio station plays music, the media payload data includes the music data. In contrast, the metadata is descriptive data about the media payload data. For example, the metadata corresponding to a particular song may include the title of the song, the album name, an image from the song's album, etc.

Traditionally, when a client accesses a data stream for an Internet radio station, the client receives both the metadata and the media payload data. However, under some circumstances, the client may only use the metadata. For example, the client may be configured to display the current metadata from several different Internet radio stations to the user, thereby allowing the user to quickly see what is currently playing on the different stations. As another example, the metadata from one or more Internet radio stations may be used for data mining operations.

One approach for obtaining the metadata for an Internet radio station is to receive both the metadata and the media payload data, and then discard the media payload data. However, such an approach is inefficient because network resources are used to transmit and receive the media payload data, which the client does not use. Accordingly, benefits may be realized by improved systems and methods for obtaining the metadata for an Internet radio station.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
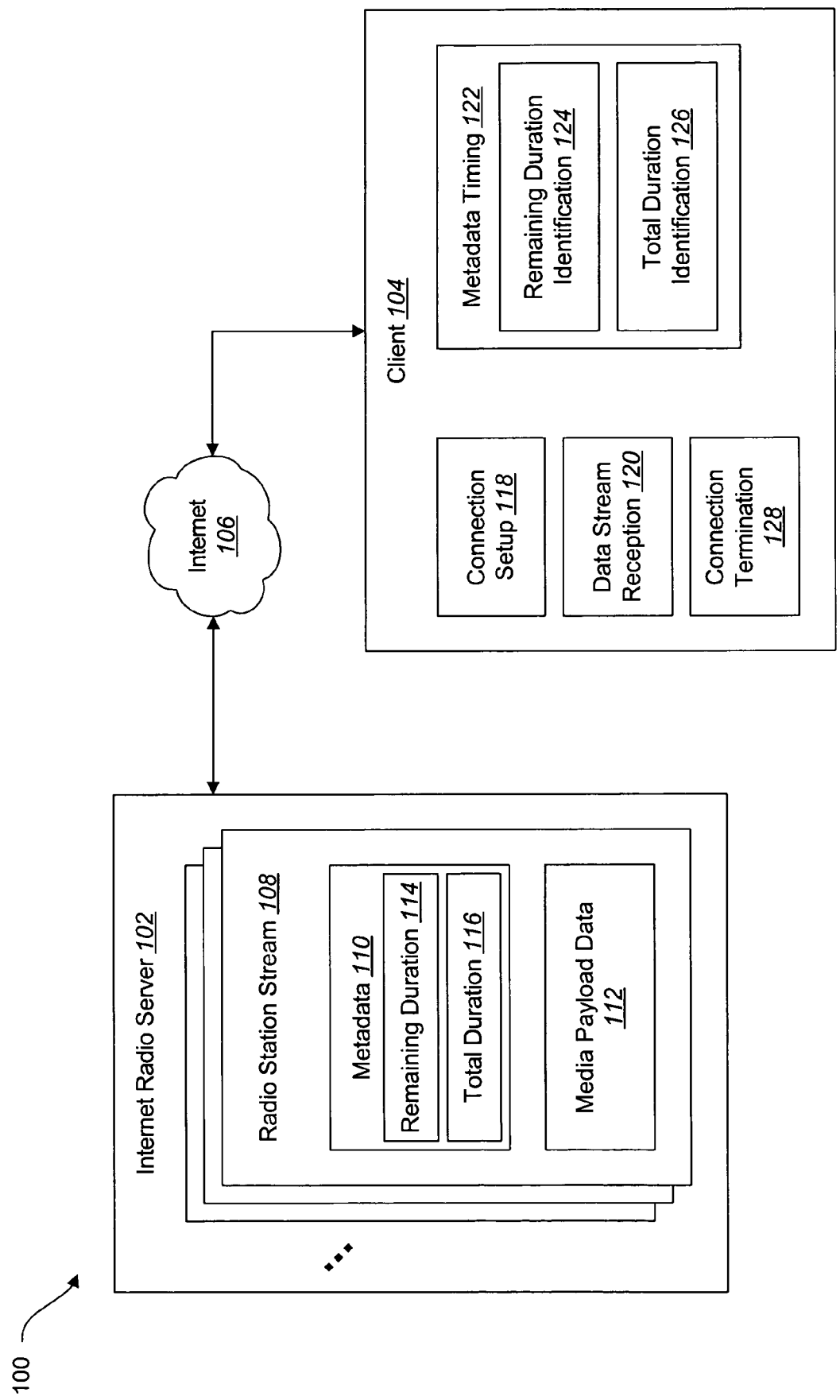
FIG. 1 is a functional block diagram which illustrates an exemplary system in which some embodiments may be practiced.

A method for obtaining metadata from an Internet radio station in a bandwidth-efficient manner is disclosed. The method may be implemented by a client computing device. In accordance with the method, the client device connects to an Internet radio server to receive a data stream corresponding to an Internet radio station. Metadata on the Internet radio station data stream is also received. The client device disconnects from the Internet radio server, and determines when next metadata is going to be sent on the Internet radio station data stream. The client device reconnects to the Internet radio server before the next metadata is sent on the Internet radio station data stream. In some embodiments, the steps of receiving the metadata, disconnecting from the Internet radio server, determining when the next metadata is going to be sent, and reconnecting to the Internet radio server are performed repeatedly.

The step of determining when the next metadata is going to be sent may involve determining a remaining duration of a current audio segment that is playing on the Internet radio station. In some embodiments, the step of determining the remaining duration of the current audio segment involves identifying the remaining duration of the current audio segment in the metadata that was received for the current audio segment.

In other embodiments, the step of determining the remaining duration of the current audio segment involves identifying a total duration of the current audio segment in the metadata that was received for the current audio segment. The client device receives media payload data for the current audio segment, and identifies elapsed time information or remaining time information about the current audio segment in the media payload data. The remaining duration of the current audio segment is then determined using the total duration of the current audio segment and the elapsed time information.

In some embodiments, the step of determining when the next metadata is going to be sent involves determining a total duration of an audio segment that is playing or that is about to play on the Internet radio station. Also, in some embodiments, the client device receives media payload data for an initial audio segment that is playing when the client initially connects to the Internet radio server.

The metadata and media payload data of the Internet radio station data stream may be sent from the Internet radio server to the client via a same connection. The connection may be an HTTP connection. The metadata and media payload data of the Internet radio station data stream may be streamed from the Internet radio server to the client. The metadata may be multiplexed with the media payload data. Alternatively, the metadata may be included as part of the media payload data.

A client computing device that is configured to implement the above-described method for obtaining metadata from an Internet radio station in a bandwidth-efficient manner is also disclosed. The client device includes a processor and memory in electronic communication with the processor. Instructions are stored in the memory. The instructions are executable to implement the above-described method. In addition, a computer-readable storage medium comprising executable instructions for implementing the above-described method for obtaining metadata from an Internet radio station in a bandwidth-efficient manner is also disclosed.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Those skilled in the art will appreciate that many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, those skilled in the art will recognize that such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a functional block diagram which illustrates an exemplary system 100 in which some embodiments may be practiced. The system 100 includes an Internet radio server 102 and a client 104. The server 102 and the client 104 are in communication with one another via the Internet 106.

The server 102 exposes a number of different data streams 108 to the client 104. Each data stream 108 corresponds to a different Internet radio station. Each data stream 108 includes both metadata 110 and media payload data 112.

Metadata 110 is sent for each audio segment (e.g., song, talk show segment, voice-over, commercial, etc.). The metadata 110 for a particular audio segment is sent when the previous audio segment finishes playing. For example, if song A and song B are played sequentially on an Internet radio station, the metadata 110 for song B is sent when song A finishes playing or is about to finish playing.

The metadata 110 may be sent separately from or together with the media payload data 112. In some embodiments, the server 102 may utilize a "multiplexed" architecture. With a multiplexed architecture, the metadata 110 for a particular audio segment is sent multiplexed on the same connection (e.g., the same HTTP connection) as the media payload data. The metadata is typically sent just before the media payload data 112 for a new audio segment is sent. Alternatively, the server 102 may utilize an "embedded" architecture. With an embedded architecture, the metadata 110 for a particular audio segment is sent together with the media payload data 112 as a part of it. For example, the media payload data 112 may be MP3 data, and the metadata 110 may be ID3 tags which are included in the MP3 data.

In the illustrated embodiment, the metadata 110 for a particular audio segment includes an indication of the remaining duration 114 of the audio segment. The metadata 110 for a particular audio segment also includes an indication of the total duration 116 of the audio segment.

The client 104 includes a connection setup component 118. The connection setup component 118 is configured to establish a connection with the Internet radio server 102. The connection may be an HTTP connection.

The client 104 also includes a data stream reception component 120. The data stream reception component 120 is configured to receive a data stream 108 corresponding to an Internet radio station from the server 102.

The client 104 also includes a metadata timing component 122. The metadata timing component 122 is configured to determine when metadata 110 is next going to be sent on a radio station stream 108.

In the illustrated embodiment, the metadata timing component 122 includes a remaining duration identification component 124 and a total duration identification component 126. The remaining duration identification component 124 is configured to identify the remaining duration 114 of an audio segment. Similarly, the total duration identification component 126 is configured to identify the total duration 116 of an audio segment.

The media client 104 also includes a connection termination component 128. The connection termination component 128 is configured to terminate a connection with the Internet radio server 102 that has previously been established.

Figure 2:
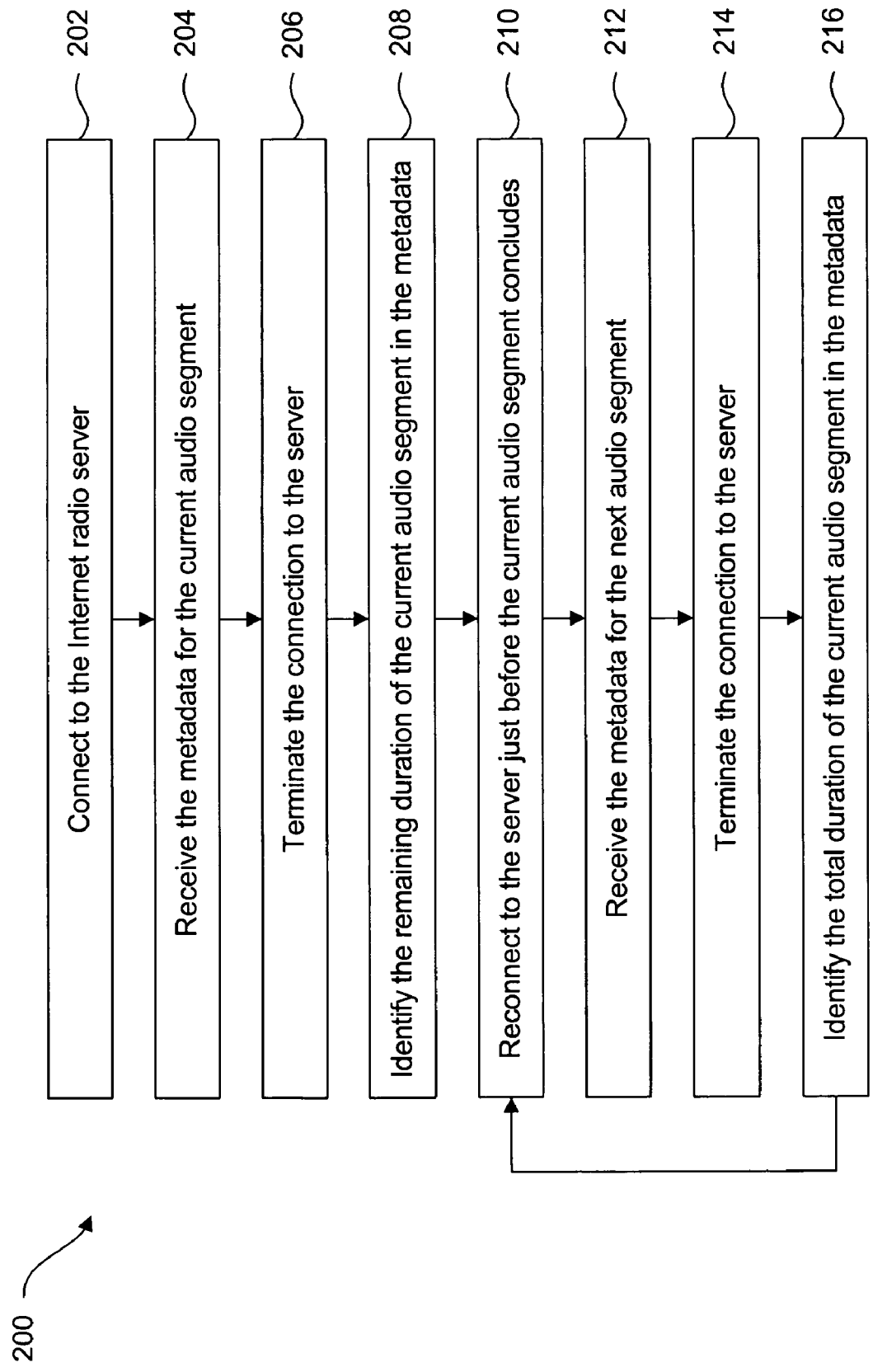
FIG. 2 is a flow diagram which illustrates how the components in the system of FIG. 1 may operate to implement a method for obtaining the metadata from an Internet radio station in a bandwidth-efficient manner.

FIG. 2 is a flow diagram which illustrates how the components in the system 100 of FIG. 1 may operate to implement a method 200 for obtaining the metadata 110 from an Internet radio station in a bandwidth-efficient manner. The method 200 begins when the connection setup component 118 connects 202 to the Internet radio server 102. In response, the data stream reception component 120 receives a data stream 108 corresponding to an Internet radio station from the server 102. Initially, the metadata 110 for the current audio segment is received 204. The metadata 110 may be received separately from the media payload data 112 (if, for example, the server 102 utilizes a multiplexed architecture) or together with the media payload data 112 (if, for example, the server 102 utilizes an embedded architecture).

Once the metadata 110 has been received, the connection termination component 128 terminates 206 the connection to the server 102. As a result, at least some of the media payload data 112 for the current audio segment is not streamed from the server 102 to the client 104. This results in a more efficient use of network resources, because network resources are not used to transmit and receive data that is not going to be used by the client 104. Advantageously, the additional efficiency is obtained without modifications being made to the server 102.

The metadata timing component 122 determines when the next metadata 110 is going to be sent on the radio station stream 108. The first time that the client 104 connects to the server 102, this step is performed by the remaining duration identification component 124. More specifically, the remaining duration identification component 124 identifies 208 the remaining duration 114 of the current audio segment in the metadata 110 for the current audio segment. Once the remaining duration 114 of the current audio segment is known, this tells the client 104 when the next metadata 110 is going to be sent (because the next metadata 110 will be sent when the current audio segment stops playing).

The connection setup component 118 reconnects 210 to the server 102 just before the current audio segment concludes. Precisely how much earlier the client 104 reconnects to the server 102 may depend on several factors, such as the requirements of the Internet radio server 102, network congestion, typical connection setup time, etc.

When the current audio segment concludes, the metadata 110 for the next audio segment is sent on the radio station stream 108. The metadata 110 may be sent separately from the media payload data 112 (if the server 102 uses a multiplexed architecture) or together with the media payload data 112 (if the server 102 uses an embedded architecture). The data stream reception component 120 receives 212 the metadata 110 for the next audio segment (which then becomes the current audio segment). Once the metadata 110 has been received, the connection termination component 128 terminates 214 the connection to the server 102.

As before, the metadata timing component 122 determines when the next metadata 110 is going to be sent on the radio station stream 108. Each time after the first time that the client 104 connects to the server 102, this step is performed by the total duration identification component 126. More specifically, the total duration identification component 126 identifies 216 the total duration 116 of the current audio segment in the metadata 110 that is received for the current audio segment. Once the total duration 116 of the current audio segment is known, this tells the client 104 when the next metadata 110 is going to be sent (because at this point in the method 200 the current audio segment is at the beginning of its playback, and the next metadata 110 will be sent when the current audio segment stops playing).

Steps 210 through 216 of the method 200 are then repeated. Specifically, the connection setup component 118 reconnects 210 to the server 102 just before the current audio segment concludes. The data stream reception component 120 receives 212 metadata 110 for the next audio segment (which then becomes the current audio segment). The connection termination component 128 terminates 214 the connection to the server 102. The total duration identification component 126 identifies 216 the total duration 116 of the current audio segment in the metadata 110 for the current audio segment. This cycle continues until the client 104 receives an instruction to discontinue obtaining the metadata 110 for the Internet radio station. In some embodiments step 206 may be performed after or in parallel with step 208. Similarly, step 214 may be performed after or in parallel with step 216.

Figure 3:
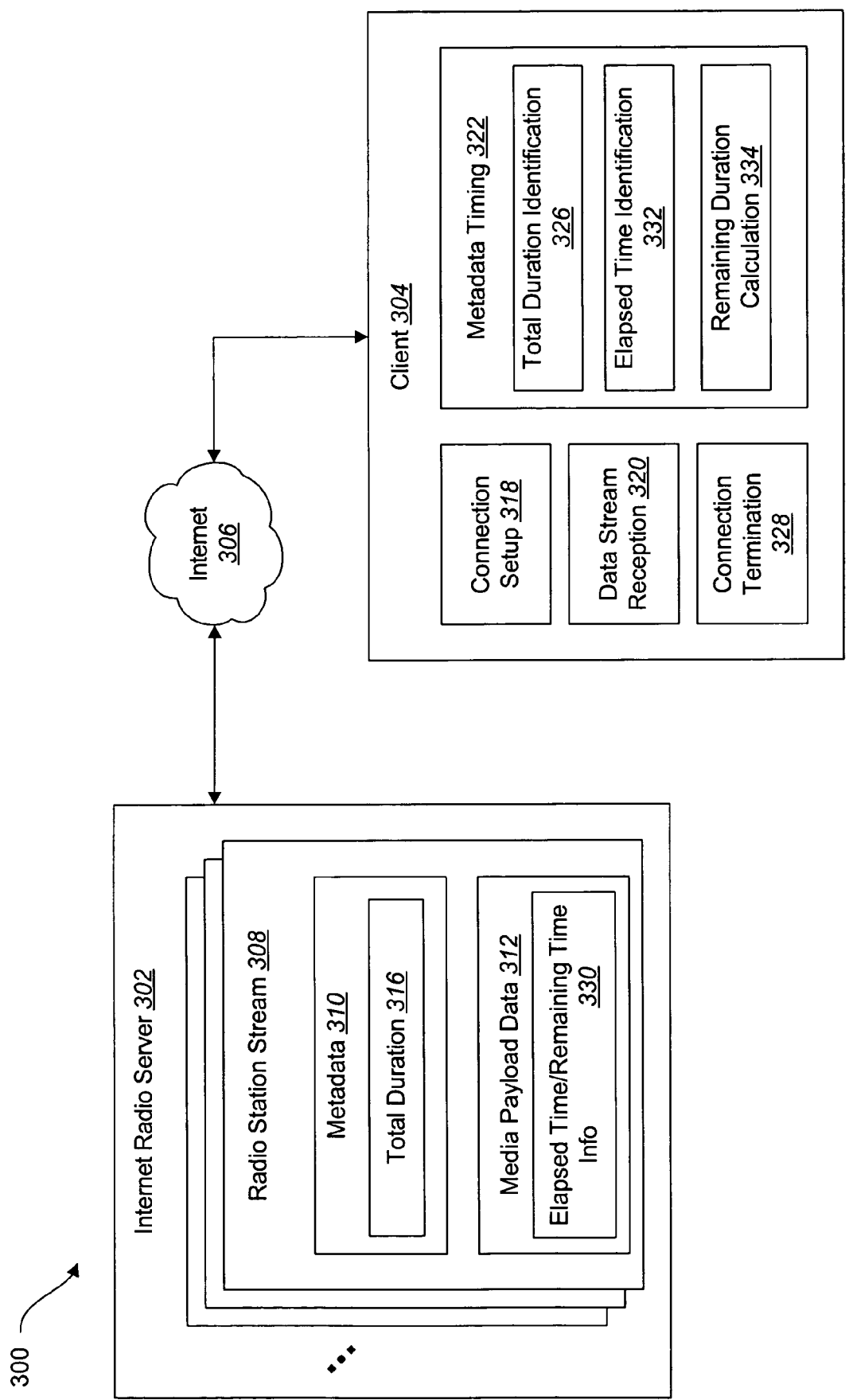
FIG. 3 is a functional block diagram which illustrates another exemplary system in which some embodiments may be practiced.

FIG. 3 is a functional block diagram which illustrates another exemplary system 300 in which some embodiments may be practiced. As before, the system 300 includes an Internet radio server 302 and a client 304. The server 302 and the client 304 are in communication with one another via the Internet 306. The server 302 exposes different data streams 308 corresponding to different Internet radio stations to the client 304. Each data stream 308 includes both metadata 310 and media payload data 312.

In the illustrated embodiment, the metadata 310 for a particular audio segment includes an indication of the total duration 316 of the audio segment. However, the metadata 310 for a particular audio segment does not include an indication of the remaining duration of the audio segment.

The media payload data 312 includes elapsed time information and/or remaining time information 330. The elapsed time information 330 is an indication of the amount of time that has elapsed since the audio segment started playing. For example, the elapsed time information 330 may be a timestamp, frame number, etc. Alternatively, or in addition, the media payload data 312 may include remaining time information 330 which indicates the amount of time remaining in the current audio segment.

As before, the client 304 includes a connection setup component 318, a data stream reception component 320, a connection termination component 328, and a metadata timing component 322. The metadata timing component 322 includes a total duration identification component 326. A description of the functionality performed by each of these components was provided above, and will not be repeated here.

In the illustrated embodiment, the metadata timing component 322 also includes an elapsed time identification component 332 and a remaining duration calculation component 334. The elapsed time identification component 332 is configured to identify the elapsed time information 330 in the media payload data 312. The remaining duration calculation component 334 is configured to calculate the remaining duration of the current audio segment using the total duration 316 of the current audio segment and the elapsed time information 330 for the current audio segment. The remaining duration of the current audio segment may be calculated as the total duration 316 of the current audio segment minus the elapsed time 332 of the current audio segment.

Figure 4:
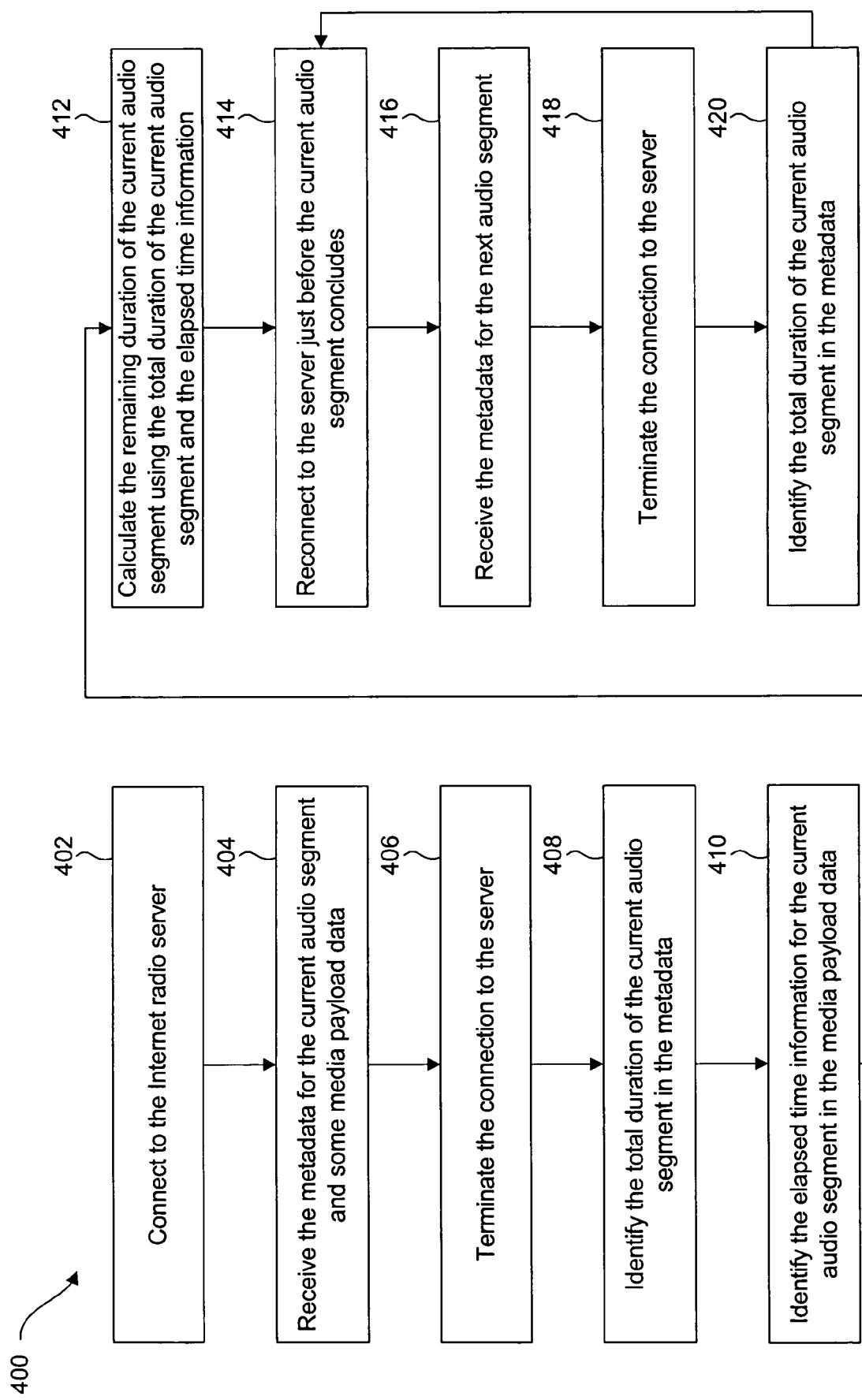
FIG. 4 is a flow diagram which illustrates how the components in the system of FIG. 3 may operate to implement a method for obtaining the metadata from an Internet radio station in a bandwidth-efficient manner.

FIG. 4 is a flow diagram which illustrates how the components in the system 300 of FIG. 3 may operate to implement a method 400 for obtaining the metadata 310 from an Internet radio station in a bandwidth-efficient manner. The method 400 begins when the connection setup component 318 connects 402 to the Internet radio server 302. In response, the data stream reception component 320 receives a data stream 308 corresponding to an Internet radio station from the server 302. Initially, the metadata 310 for the current audio segment is received 404. Also, some media payload data for the currently playing audio segment is received until the client is able to figure out the elapsed and/or the remaining time for the current audio segment based on the media payload (e.g., from the frame number or timestamp). Once the metadata 310 has been received, the connection termination component 328 terminates 406 the connection to the server 302 so that at least some of the media payload data 312 is not streamed from the server 302 to the client 304.

The metadata timing component 322 determines when the next metadata 310 is going to be sent on the radio station stream 308. The first time that the client 304 connects to the server 302, this step is performed by the total duration identification component 326, the elapsed time identification component 332, and the remaining duration calculation component 334. More specifically, the total duration identification component 326 identifies 408 the total duration 316 of the current audio segment in the metadata 310 that was received for the current audio segment. The elapsed time identification component 332 identifies 410 the elapsed time information 330 for the current audio segment in the media payload data 312. The remaining duration calculation component 334 calculates 412 the remaining duration of the current audio segment using the total duration 316 of the current audio segment and the elapsed time information 330. Once the remaining duration of the current audio segment is known, this tells the client 304 when the next metadata 310 is going to be sent (because, as indicated above, the next metadata 310 will be sent when the current audio segment stops playing).

The connection setup component 318 reconnects 414 to the server 302 just before the current audio segment concludes. When the current audio segment concludes, the metadata 310 for the next audio segment is sent on the radio station stream 308 and received 416 by the data stream reception component 320 of the client 304. Once the metadata 310 for the next audio segment (which then becomes the current audio segment) has been received, the connection termination component 328 terminates 418 the connection to the server 302.

The metadata timing component 322 again determines when the next metadata 310 is going to be sent on the radio station stream 308. Each time after the initial connection to the server 302, this step is performed by the total duration identification component 326. More specifically, the total duration identification component 326 identifies 420 the total duration 316 of the current audio segment in the metadata 310 that was received for the current audio segment. Once the total duration 316 of the current audio segment is known, this tells the client 304 when the next metadata 310 is going to be sent (because at this point in the method 400 the current audio segment is at the beginning of its playback, and the next metadata 310 will be sent when the current audio segment stops playing).

Steps 414 through 420 of the method 400 are then repeated. Specifically, the connection setup component 318 reconnects 414 to the server 302 just before the current audio segment concludes. The data stream reception component 320 receives 416 metadata 310 for the next audio segment (which then becomes the current audio segment). The connection termination component 328 terminates 418 the connection to the server 302. The total duration identification component 326 identifies 420 the total duration 316 of the current audio segment in the metadata 310 for the current audio segment. This cycle continues until the client 304 receives an instruction to discontinue obtaining the metadata 310 for the Internet radio station. In some embodiments step 406 may be performed after or in parallel with step 412. Similarly, step 418 may be performed after or in parallel with step 420.

Figure 5:
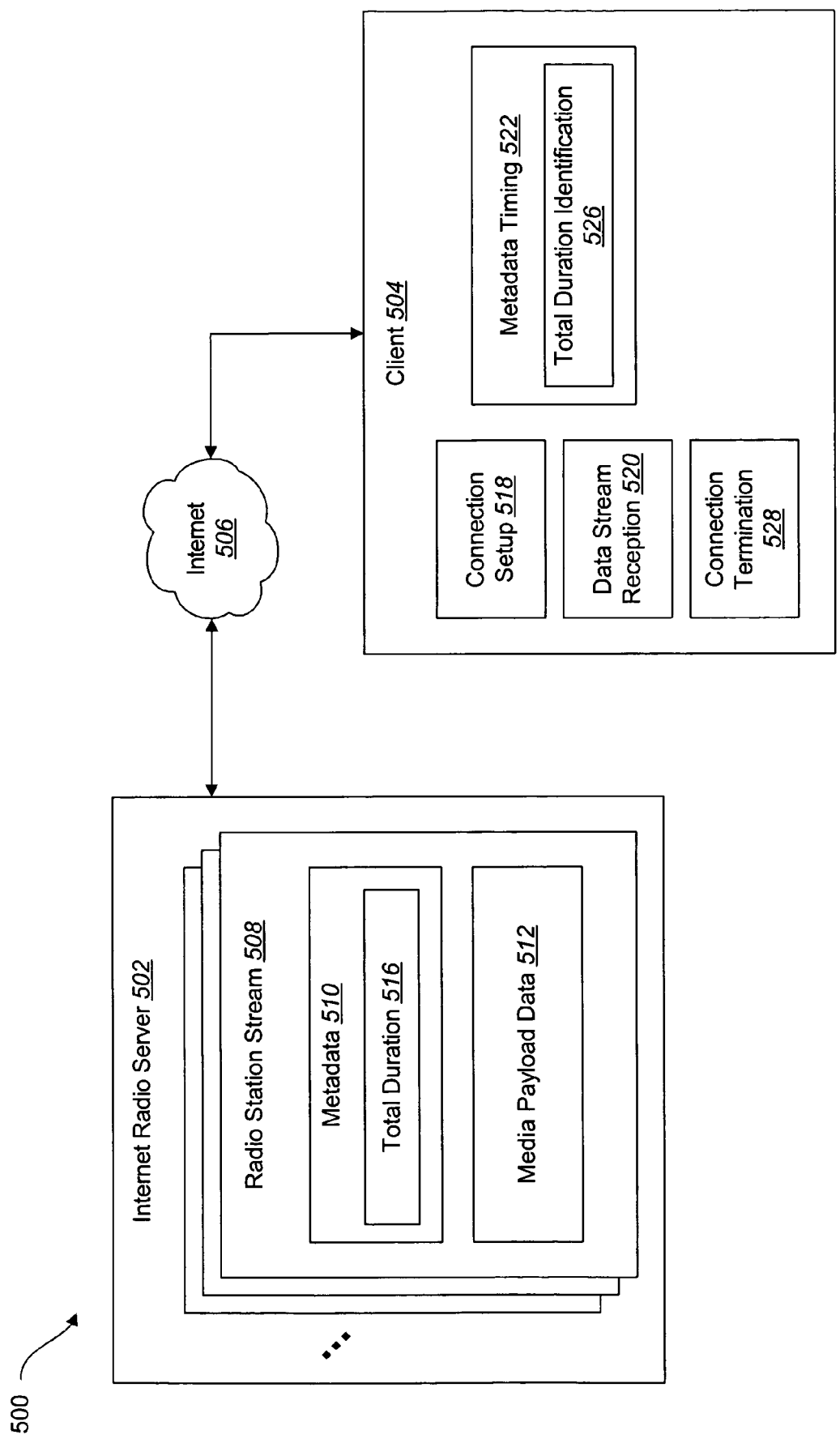
FIG. 5 is a functional block diagram which illustrates another exemplary system in which some embodiments may be practiced.

FIG. 5 is a functional block diagram which illustrates another exemplary system 500 in which some embodiments may be practiced. As before, the system 500 includes an Internet radio server 502 and a client 504. The server 502 and the client 504 are in communication with one another via the Internet 506. The server 502 exposes a number of different data streams 508 corresponding to different Internet radio stations to the client 504. Each data stream 508 includes both metadata 510 and media payload data 512.

In the illustrated embodiment, the metadata 510 for a particular audio segment includes an indication of the total duration 516 of the audio segment. However, the metadata 510 does not include an indication of the remaining duration of the audio segment. Also, the media payload data 512 does not include an indication of any elapsed time information and/or remaining time information for the current audio segment.

As before, the client 504 includes a connection setup component 518, a data stream reception component 520, a connection termination component 528, and a metadata timing component 522. The metadata timing component 522 includes a total duration identification component 526. A description of the functionality performed by each of these components was provided above, and will not be repeated here. In the illustrated embodiment, the metadata timing component 522 does not include several components discussed above, such as a remaining duration identification component, an elapsed time identification component, or a remaining duration calculation component.

Figure 6:
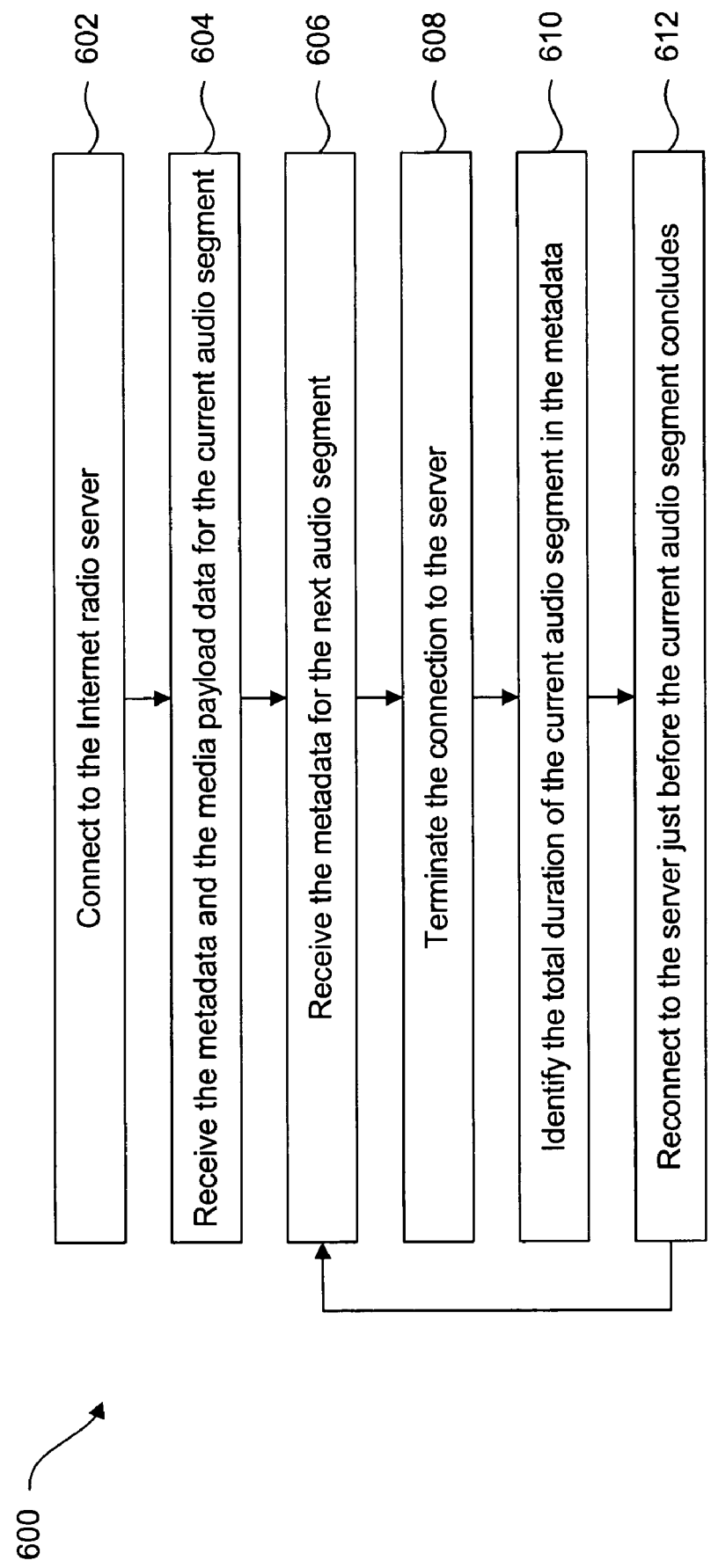
FIG. 6 is a flow diagram which illustrates how the components in the system of FIG. 5 may operate to implement a method for obtaining the metadata from an Internet radio station in a bandwidth-efficient manner.

FIG. 6 is a flow diagram which illustrates how the components in the system 500 of FIG. 5 may operate to implement a method 600 for obtaining the metadata 510 from an Internet radio station in a bandwidth-efficient manner. The method 600 begins when the connection setup component 518 connects 602 to the Internet radio server 502. In response, the data stream reception component 520 receives a data stream 508 corresponding to an Internet radio station from the server 502. As before, the metadata 510 for the current audio segment is received 604. In addition, the first time that the client 504 connects to the server 502, the client 504 remains connected to the server 502 so that the media payload data 512 for the current audio segment is also received 604. This is because the metadata timing component 522 does not have enough information to determine when the next metadata 510 is going to be sent on the Internet radio station.

When the current audio segment finishes, the data stream reception component 520 receives 606 the metadata 510 for the next audio segment (which then becomes the current audio segment). Once the metadata 510 has been received, the connection termination component 528 terminates 608 the connection to the server 502.

The metadata timing component 522 determines when the next metadata 510 is going to be sent on the radio station stream 508. In the illustrated embodiment, this step is performed by the total duration identification component 526, which identifies 610 the total duration 516 of the current audio segment in the metadata 510 that was received for the current audio segment. Once the total duration of the current audio segment is known, this tells the client 504 when the next metadata 510 is going to be sent (because the current audio segment is at the beginning of its playback, and the next metadata 510 will be sent when the current audio segment stops playing). The connection setup component 518 then reconnects 612 to the server 502 just before the current audio segment concludes.

Steps 606 through 612 of the method 600 are then repeated. Specifically, the data stream reception component 520 receives 606 the metadata 510 for the next audio segment (which then becomes the current audio segment). The connection termination component 528 terminates 608 the connection to the server 502. The total duration identification component 526 identifies 610 the total duration 516 of the current audio segment in the metadata 510 that was received for the current audio segment. The connection setup component 518 reconnects 612 to the server 502 just before the current audio segment concludes. This cycle continues until the client 504 receives an instruction to discontinue obtaining the metadata 510 for the Internet radio station. In some embodiments step 608 may be performed after or in parallel with step 610.

In view of the foregoing, the embodiments disclosed herein offer several advantages not available in conventional approaches. The client is able to obtain the metadata for an Internet radio station without receiving at least some of the media payload data. This results in a more efficient use of network resources, because network resources are not used to transmit and receive data that is not going to be used by the client. Advantageously, the additional efficiency is obtained without any modifications being made to the Internet radio server.

In addition, any extra bandwidth that is used because the client is repeatedly disconnecting from and reconnecting to the server is negligible compared to the amount of bandwidth that is saved by the client not receiving at least some of the media payload data. More specifically, for a client to establish a connection to a server using the HTTP protocol, it typically requires $3 \times (40) + H + X + R + 4 \times (40)$ bytes (upstream+downstream). In this expression, the variable X is equal to the size of the HTTP request, which will be typically be close to the length of the URL. The variable H is equal to the size of the HTTP request headers. The variable R is equal to the size of the HTTP response headers. The factors of 3 and 4 correspond to the three-way TCP connection setup and disconnect respectively, with no extra TCP options. Considering an average song duration of three minutes, and $H=R=X=100$ bytes, the proposed approach requires only approximately $$\frac{(560 \times 8)}{(3 \times 60)} = 25.77$$

bits per second of extra overhead. This is a negligible value compared to the fact that the proposed approach results in the client not wasting bandwidth by not receiving the media payload data.

Figure 7:
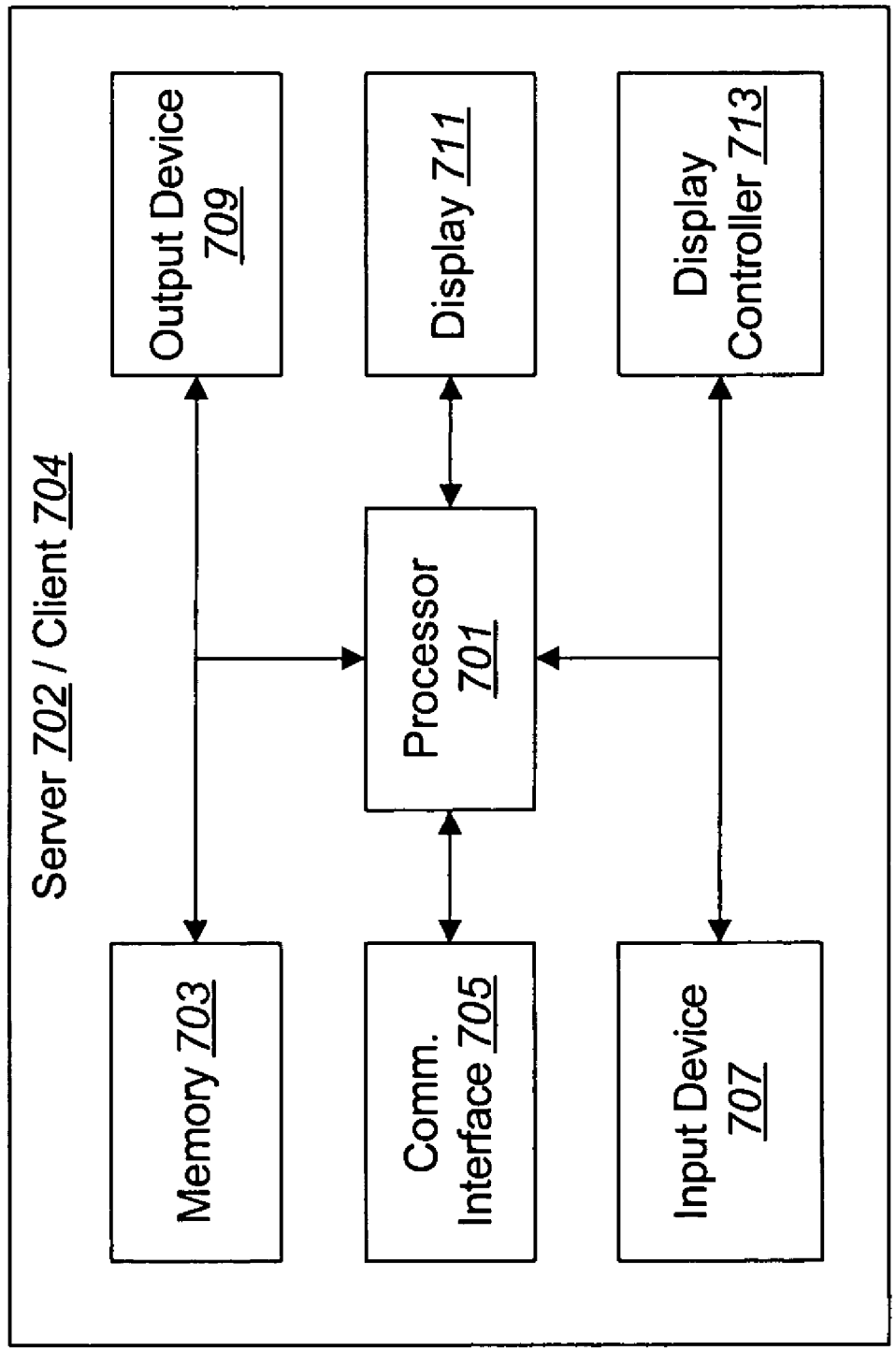
FIG. 7 is a block diagram illustrating the major hardware components typically utilized in a server and/or a client.

FIG. 7 is a block diagram illustrating the major hardware components typically utilized in a server 702 and/or a client 704. The illustrated components may be located within the same physical structure or in separate housings or structures.

The server 702/client 704 includes a processor 701 and memory 703. The processor 701 controls the operation of the server 702/client 704 and may be embodied as a microprocessor, a microcontroller, a digital signal processor (DSP) or other device known in the art. The processor 701 typically performs logical and arithmetic operations based on program instructions stored within the memory 703.

As used herein, the term "memory" 703 is broadly defined as any electronic component capable of storing electronic information, and may be embodied as read only memory (ROM), random access memory (RAM), magnetic disk storage media, optical storage media, flash memory devices in RAM, on-board memory included with the processor 701, EPROM memory, EEPROM memory, registers, etc. The memory 703 typically stores program instructions and other types of data. The program instructions may be executed by the processor 701 to implement some or all of the methods disclosed herein.

The server 702/client 704 typically also includes one or more communication interfaces 705 for communicating with other electronic devices. The communication interfaces 705 may be based on wired communication technology, wireless communication technology, or both. Examples of different types of communication interfaces 705 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The server 702/client 704 typically also includes one or more input devices 707 and one or more output devices 709. Examples of different kinds of input devices 707 include a keyboard, mouse, microphone, remote control device, button, joystick, trackball, touchpad, lightpen, etc. Examples of different kinds of output devices 709 include a speaker, printer, etc. One specific type of output device which is typically included in a computer system is a display device 711. Display devices 711 used with embodiments disclosed herein may utilize any suitable image projection technology, such as a cathode ray tube (CRT), liquid crystal display (LCD), light-emitting diode (LED), gas plasma, electroluminescence, or the like. A display controller 713 may also be provided, for converting data stored in the memory 703 into text, graphics, and/or moving images (as appropriate) shown on the display device 711.

Of course, FIG. 7 illustrates only one possible configuration of a server 702/client 704. Those skilled in the art will recognize that various other architectures and components may be utilized. In addition, various standard components are not illustrated in order to avoid obscuring aspects of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. In a client computing device, a method for obtaining metadata from an Internet radio station in a bandwidth-efficient manner, the method comprising:
    connecting to an Internet radio server to receive a data stream corresponding to an Internet radio station;
    receiving metadata on the Internet radio station data stream;
    disconnecting from the Internet radio server;
    determining when next metadata is going to be sent on the Internet radio station data stream; and
    reconnecting to the Internet radio server before the next metadata is sent on the Internet radio station data stream, wherein the timing of the reconnection to the Internet radio server is based on the determination of when the next metadata is going to be sent on the Internet radio station data stream.

2. The method of claim 1, wherein the steps of receiving the metadata, disconnecting from the Internet radio server, determining when the next metadata is going to be sent, and reconnecting to the Internet radio server are performed repeatedly.

3. The method of claim 1, wherein determining when the next metadata is going to be sent comprises determining a remaining duration of a current audio segment that is playing on the Internet radio station.

4. The method of claim 3, wherein determining the remaining duration of the current audio segment comprises identifying the remaining duration of the current audio segment in the metadata that was received for the current audio segment.

5. The method of claim 3, wherein determining the remaining duration of the current audio segment comprises:
identifying a total duration of the current audio segment in the metadata that was received for the current audio segment;
receiving media payload data for the current audio segment;
identifying elapsed time information or remaining time information about the current audio segment in the media payload data; and
determining the remaining duration of the current audio segment using the total duration of the current audio segment and the elapsed time information.

6. The method of claim 1, wherein determining when the next metadata is going to be sent comprises determining a total duration of an audio segment that is playing or that is about to play on the Internet radio station.

7. The method of claim 1, wherein the method further comprises receiving media payload data for an initial audio segment that is playing when the client initially connects to the Internet radio server.

8. The method of claim 1, wherein the metadata and media payload data of the Internet radio station data stream are sent from the Internet radio server to the client via a same connection.

9. The method of claim 8, wherein the connection is an HTTP connection.

10. The method of claim 8, wherein the metadata is multiplexed with the media payload data.

11. The method of claim 8, wherein the metadata is included as part of the media payload data.

12. The method of claim 1, wherein the metadata and media payload data of the Internet radio station data stream are streamed from the Internet radio server to the client.

13. A client computing device that is configured to obtain metadata from an Internet radio station in a bandwidth-efficient manner, comprising:
a processor;
memory in electronic communication with the processor;
instructions stored in the memory, the instructions being executable to:
connect to an Internet radio server to receive a data stream corresponding to an Internet radio station;
receive metadata on the Internet radio station data stream;
disconnect from the Internet radio server;
determine when next metadata is going to be sent on the Internet radio station data stream; and
reconnect to the Internet radio server before the next metadata is sent on the Internet radio station data stream, wherein the timing of the reconnection to the Internet radio server is based on the determination of when the next metadata is going to be sent on the Internet radio station data stream.

14. The client computing device of claim 13, wherein the steps of receiving the metadata, disconnecting from the Internet radio server, determining when the next metadata is going to be sent, and reconnecting to the Internet radio server are performed repeatedly.

15. The client computing device of claim 13, wherein determining when the next metadata is going to be sent comprises determining a remaining duration of a current audio segment that is playing on the Internet radio station.

16. The client computing device of claim 13, wherein determining when the next metadata is going to be sent comprises determining a total duration of an audio segment that is playing or that is about to play on the Internet radio station.

17. A computer-readable storage medium comprising instructions that, when executed, cause a processor in a client computing device to:
connect to an Internet radio server to receive a data stream corresponding to an Internet radio station;
receive metadata on the Internet radio station data stream;
disconnect from the Internet radio server;
determine when next metadata is going to be sent on the Internet radio station data stream; and
reconnect to the Internet radio server before the next metadata is sent on the Internet radio station data stream, wherein the timing of the reconnection to the Internet radio server is based on the determination of when the next metadata is going to be sent on the Internet radio station data stream.

18. The computer-readable storage medium of claim 17, wherein the steps of receiving the metadata, disconnecting from the Internet radio server, determining when the next metadata is going to be sent, and reconnecting to the Internet radio server are performed repeatedly.

19. The computer-readable storage medium of claim 17, wherein determining when the next metadata is going to be sent comprises determining a remaining duration of a current audio segment that is playing on the Internet radio station.

20. The computer-readable storage medium of claim 17, wherein determining when the next metadata is going to be sent comprises determining a total duration of an audio segment that is playing or that is about to play on the Internet radio station.

* * * * *

UNITED STATES PATENT AND TRADEMARK OFFICE
CERTIFICATE OF CORRECTION

PATENT NO. : 7,631,095 B2  Page 1 of 1
APPLICATION NO. : 11/059203
DATED : December 8, 2009
INVENTOR(S) : Sachin G. Deshpande It is certified that error appears in the above-identified patent and that said Letters Patent is hereby corrected as shown below:

In Column 9, lines 32-33 please replace the equation " $\dfrac{(560\times 8)}{(3\times 60)} = 25.77$ "

with -- $\dfrac{(580\times 8)}{(3\times 60)} = 25.77$ --.

Signed and Sealed this

Sixth Day of July, 2010

David J. Kappos
*Director of the United States Patent and Trademark Office*